United States Patent Office
3,562,728
Patented Feb. 9, 1971

3,562,728
DEVICE FOR MONITORING INDUSTRIAL INSTALLATIONS
Claude Cronier, Paris France, assignor to Compagnie Francaise d'Etudes et de Construction Technip, Rueil-Malmaison, France, a French body corporate
Filed Oct. 30, 1967, Ser. No. 679,067
Claims priority, application France, Nov. 3, 1966, 82,316
Int. Cl. G08c 19/32
U.S. Cl. 340—184      5 Claims

ABSTRACT OF THE DISCLOSURE

A monitoring device comprising transmitters each of which measures a signal which corresponds to a value involved in the installation to be monitored. The transmitters can be selectively connected to a set of receivers for recording a selected one of said signals. A switching means connected to the transmitters and receivers is actuated by individual switching elements respectively provided on each transmitter and receiver. The individual switching elements can be controlled by transferable control devices such as plugs whereby the transfer of a plug connects a given transmitter to a given receiver, the switching means being actuated by the individual switching elements of the transmitter and receiver for establishing the appropriate connection.

---

Figure 1:
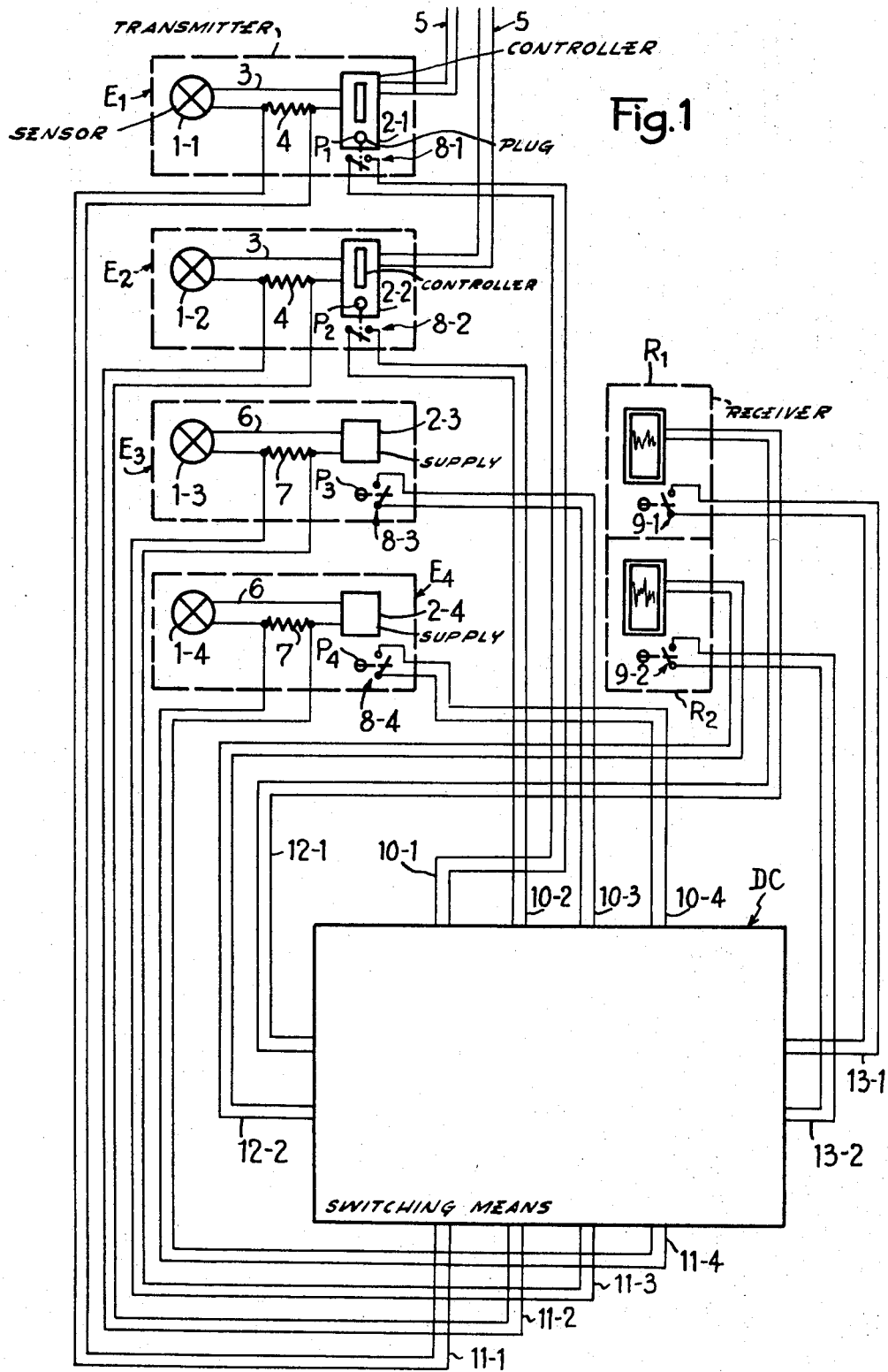

The present invention relates to devices for the monitoring of industrial installations.

The present-day tendency to concentrate in a single control room the control and monitoring of industrial installations, such as oil refineries and of petro-chemical, chemical, nuclear and other plants and the development of digital or analogous control by means of computer have compelled search for solutions so as to enable the maximum concentration of control and monitoring instruments on control panels or desks of control rooms.

In particular, up to the present time, the tendency has been to employ recorders of signals characterizing the sequence of fabrication processes or operation of units of the installation so as to facilitate the task of the operator in thus creating equipment constituting visual memories which enable the evolution of the signals transmitted by each unit of the installation to be followed easily.

However, it will be understood that the use of a high number of recorders results in a bulky and costly control device and that, in order to save space, it is necessary to reduce the number of variables to be recorded, but that the elimination of certain recorders results in the control effected by the operator being less reliable.

The object of the invention is to provide an arrangement of the monitoring device for reducing the number of instruments without reducing the number of recorded variables.

The monitoring device according to the invention comprises a series of $n_1$ transmitters each of which measures a signal which is characteristic of a variable value involved in the process or present in the installation to be monitored, a series of $n_2$ receivers for selectively recording any one of said signals, switching means electrically connected between the series of transmitters and the series of receivers, each transmitter and each receiver being provided with an individual switching element connected to the switching means, a series of $n_1$ movable control elements for actuating said switching elements, the transfer of said control elements from a transmitter to any receiver controlling said switching means in such a manner that said transmitter is connected to said receiver through the respective individual switching elements.

Further features and advantages of the invention will be apparent from the ensuing description with reference to the accompanying drawings.

Figure 2:
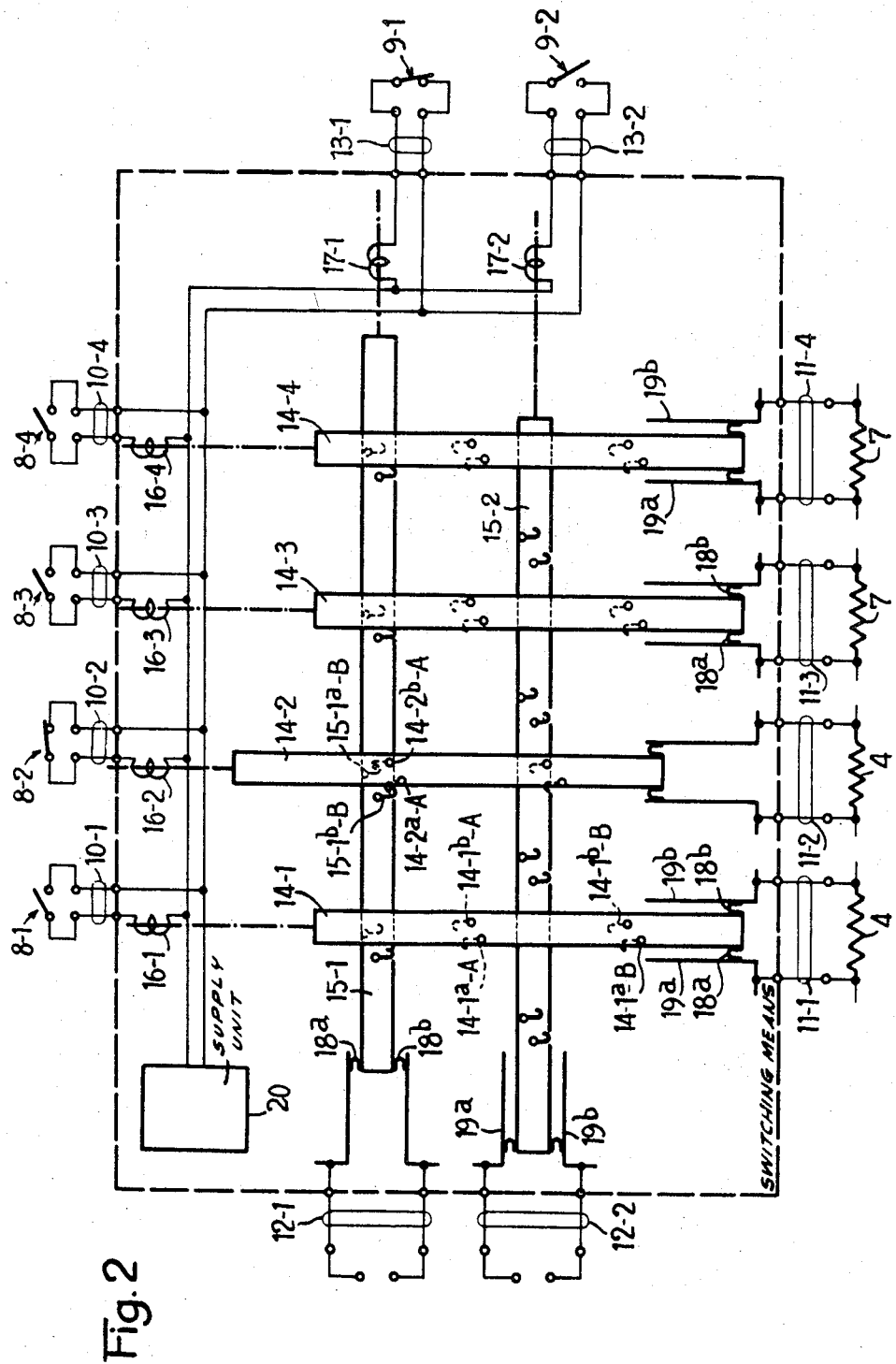

In the drawings:

FIG. 1 represents a simplified diagram of a monitoring device according to the invention for an industrial installation, and FIG. 2 illustrates an example of operation of a switching means chosen by way of example.

The figures represent an installation according to the invention of a monitoring device for an industrial installation comprising a series of four transmitters $E_1$ to $E_4$. In the illustrated embodiment, each of two of these transmitters, $E_1$ and $E_2$ for example, comprises a sensor 1–1, 1–2 sensing a variable value occurring, said sensors being respectively connected through a line 3 to controllers 2–1, 2–2 which (a) indicate the deviations between just operated values and set values and (b) control through line 5 a control valve or other means (not shown) so as to eliminate said deviations and to regulate thereby the variable values at their set values respectively. A resistor 4 is mounted in line 3.

The transmitters $E_3$, $E_4$ also each comprises a sensor 1–3, 1–4 connected to a stabilized supply 2–3, 2–4. These transmitters are intended to measure values of the installation which are not submitted to variations. The sensors are connected to the stabilized supplies through lines 6 in which resistors 7 are incorporated.

The presently-described monitoring device comprises according to the invention a series of two receivers or recorders $R_1$, $R_2$ of conventional type. These receivers can be for example recorders having one or more pens.

Each transmitter and each receiver is provided with an opening behind which a switching element is installed. These elements are designated by the reference characters 8–1 to 8–4 and 9–1, 9–2 respectively. These switching elements (in the present case switches of the telephonic jack type) can be actuated by means of a series of four plugs $P_1$, $P_2$, $P_3$, $P_4$ which are introduced into openings provided in the transmitters and receivers so that the introduction or withdrawal of a plug actuates the switch associated with the respective opening.

These plugs $P_1$ to $P_4$ can be provided with informations or references of any kind, for example a letter or a colour characteristic of a transmitter into which it is normally engaged when the transmitter is not connected to a receiver.

In the embodiment shown in FIG. 1, the plugs $P_1$ to $P_4$ can be introduced into the openings of the transmitters $E_1$ to $E_4$ respectively.

It should be understood that the invention is not limited to the type of installation shown. A small number of transmitters and receivers were chosen in order to render the description more clear. In practice, a much larger number of transmitters and receivers would be employed, depending on the requirements of adaptation of the monitoring device to the process or installation to be monitored.

A switching means DC (see also FIG. 2) selectively connects the series of transmitters to the series of receivers.

For this purpose, the switching elements 8–1 to 8–4 of the transmitters $E_1$ to $E_4$ are connected to this switching means DC through pairs of conductors or lines 10–1 to 10–4, the resistors 4 and 7 being connected to this switching means through lines 11–1 to 11–4.

Further, the inputs of the receivers $R_1$ and $R_2$ are connected to the switching means DC through lines 12–1, 12-2, the switching elements 9-1, 9-2 being connected through lines 13-1, 13-2.

FIG. 2 shows an embodiment of a switching means DC which can be used with the device according to the invention. However, this switching means could be in some other form (electronic or electromechanical for example), well known to those skilled in the art.

The switching means diagrammatically shown in FIG. 2 comprises four vertical bars 14-1 to 14-4 and two horizontal bars 15-1, 15-2. These bars can slide along their respective longitudinal axes in tracks (not shown) when actuated by the associated solenoids 16-1 to 16-4 and 17-1, 17-2 respectively. These solenoids are connected to the respective input lines 10-1 to 10-4 and 13-1, 13-2.

At the end of each bar furthest from its associated solenoid, are two brushes 18$^a$, 18$^b$ electrically insulated from each other. These rub against electrical conductors 19$^a$, 19$^b$ respectively connected to the lines 11-1 to 11-4 and 12-1, 12-2.

The solenoids 16-1 to 16-4 and 17-1, 17-2 are fed through a supply unit diagrammatically shown at 20.

Each of the bars is provided with two longitudinal series of insulated contacts, the contacts of each series being electrically interconnected and connected to one of the two brushes 18$^a$, 18$^b$ integral with the bar. The contacts are designated by the reference character of the associated bar followed by an index $a$ or $b$ depending on whether it concerns a series connected to a brush 18$^a$ or to a brush 18$^b$. Further, a capital letter reference has been added to designate the position of each contact along the length of the bar. Thus, for example the bar 14-1 is provided with a series of contacts 14-1$^a$-A, 14-1$^a$-B and another series of contacts 14-1$^b$-A, 14-1$^b$-B.

The fixed conductors 19$^a$, 19$^b$, which the brushes 18$^a$, 18$^b$ respectively rub against, are connected to the lines 11-1 to 11-4 and 12-1 and 12-2 which connect them to the resistors 4 and 7 and to the inputs of the respective receivers.

The device operates in the following manner:

Assuming that the operator monitoring the process desires to record the signal sensed by sensor 1-2 and received through its associated line 3, he withdraws the plug P$_2$ from the opening of the transmitter E$_2$ and places it in the opening provided in the receiver R$_1$. The result of this is to close the switching element 8-2 exciting the solenoid 16-2 which moves the bar 14-2 and to close the switching element 9-1 exciting the solenoid 17-1 which moves the bar 15-1.

It should be noted that, in the illustrated embodiment, the switching elements 8-1 to 8-4 are contacts which are closed when plug P$_2$ is removed whereas the switching elements 9-1 and 9-2 are closed when plug P$_2$ is inserted.

The simultaneous movements of the bars 14-2 and 15-1 bring together the contacts 14-2$^a$-A, and 15-1$^b$-B, on one hand, and the contacts 14-2$^b$-A and 15-1$^a$-B, on the other hand, and thus connect the receiver R$_1$ to the transmitter E$_2$. The established circuit is therefore the following: transmitter E$_2$ (resistor 4), line 11-2, electric conductors 19$^a$, 19$^b$ and brushes 18$^a$, 18$^b$ of the bar 14-2, hooked contacts of the bars 14-2 and 15-1, brushes 18$^a$, 18$^b$ and conductors 19$^a$, 19$^b$ of the bar 15-1, line 12-1, receiver R$_1$.

When it is desired to disconnect the transmitter E$_2$ from the receiver R$_1$, it is sufficient to withdraw the plug P$_2$ which is in the opening of the receiver R$_1$ and introduce it again into the opening of the transmitter E$_2$. Thus, the bars 14-2 and 15-1 resume their initial positions either under the action of return springs (not shown) or due to their own weight. The previously-hooked contacts are disconnected and the electric connection broken.

It can be seen that in this way it is possible to achieve all possible connections between the transmitters, on one hand, and the receivers, on the other, by means of the plugs P$_1$ to P$_4$.

Although a specific embodiment of the invention has been described, many modifications and changes may be made therein without departing from the scope of the invention as defined in the appended claims.

In particular, the embodiment described hereinbefore comprises relatively small numbers of transmitters and receivers, but naturally it is possible to increase the number of equipment by increasing the capacity of the switching means.

The switching means have been described merely by way of example for the purpose of explaining the invention. It will be understood that the invention is not intended to be limited by such switching means since these can be of any appropriate type well known to those skilled in the art.

Having now described my invention what I claim as new and desire to secure by Letters Patent is:

1. A monitoring device for an industrial process or installation, comprising a series of $n_1$ transmitters, each of which measures a signal which is characteristic of a value involved in the process or present in said installation to be monitored, a series of $n_2$ receivers for selectively recording any one of said signals, switching means electrically connected between the series of transmitters and the series of receivers and capable to connect selectively each of said transmitters to any one of said receivers, each transmitter and each receiver being provided with an individual switching element electrically connected to the switching means for controlling the switching action thereof, a series of $n_1$ movable control elements transferable between said transmitters and any one of said receivers for mechanically actuating said switching elements, the transfer of said control elements from a transmitter to any receiver controlling said individual switching elements thereof, thereby electrically connecting said transmitter and said receiver by means of said switching means.

2. A monitoring device as claimed in claim 1, wherein said switching means is an electromechanical means.

3. A monitoring device as claimed in claim 1, wherein each transmitter and each receiver is provided with an opening for introducing one of said movable control elements and behind which is disposed said individual switching element actuable by the introduction of said control element into said opening.

4. A monitoring device as claimed in claim 3, wherein said control elements are plugs.

5. A monitoring device as claimed in claim 4, wherein each plug is provided with a reference characteristic of the transmitter into which it is normally engaged when the transmitter is not connected to a receiver.

References Cited
UNITED STATES PATENTS 2,412,516   12/1946   Kavanagh _____ 340—312

DONALD J. YUSKO, Primary Examiner

G. R. SWANN III, Assistant Examiner

U.S. Cl. X.R.
340—301